United States Patent [19]
Walmet et al.

[11] 4,187,086
[45] Feb. 5, 1980

[54] PACKAGED MEMBRANE SYSTEM AND REPLENISHMENT METHOD

[75] Inventors: Gunnar E. Walmet; Stephen L. Matson, both of Schenectady, N.Y.

[73] Assignee: General Electric Company, Schenectady, N.Y.

[21] Appl. No.: 956,781

[22] Filed: Nov. 1, 1978

Related U.S. Application Data

[63] Continuation-in-part of Ser. No. 806,845, Jun. 13, 1977, abandoned.

[51] Int. Cl.$^2$ ............... B01D 13/00; B01D 59/12
[52] U.S. Cl. ............... 55/16; 55/73; 55/158; 210/23 R; 210/321 R; 423/232
[58] Field of Search ............... 55/16, 158, 73; 210/22, 210/23 R, 321 R, 321 B; 423/232

[56] References Cited

U.S. PATENT DOCUMENTS

| | | | |
|---|---|---|---|
| 2,597,907 | 5/1952 | Steiner et al. | 55/158 |
| 3,244,763 | 4/1966 | Cahn | 55/16 X |
| 3,335,545 | 8/1967 | Robb et al. | 55/16 |
| 3,354,618 | 11/1967 | Dounocos | 55/158 |
| 3,396,510 | 8/1968 | Ward, III et al. | 55/16 |
| 3,510,387 | 5/1970 | Robb | 55/16 X |
| 3,564,819 | 2/1971 | Neulander et al. | 55/158 |
| 3,616,928 | 11/1971 | Rosenblatt | 55/158 X |
| 3,661,721 | 5/1972 | Rodgers | 55/158 X |
| 3,676,220 | 7/1972 | Ward, III | 55/158 X |
| 3,735,562 | 5/1973 | Mousseau, Jr. et al. | 55/158 |
| 3,793,111 | 2/1974 | Judkins | 55/158 X |
| 3,819,806 | 6/1974 | Ward, III et al. | 55/16 X |
| 3,925,037 | 12/1975 | Ward, III et al. | 55/158 |
| 3,998,593 | 12/1976 | Yoshida et al. | 55/158 X |
| 4,025,425 | 5/1977 | Croopnick et al. | 55/16 X |

*Primary Examiner*—Robert H. Spitzer
*Attorney, Agent, or Firm*—Richard G. Jackson; Joseph T. Cohen; Paul R. Webb, II

[57] ABSTRACT

An improved method for removing a component from a fluid mixture by transport of the component through an immobilized liquid membrane is described. The method includes introducing fresh membrane liquid into a first region of the membrane to effect emission of at least partially deactivated liquid from a second region of the membrane, thereby restoring or maintaining the separation efficiency of the membrane. Also described is an improved packaged membrane system including a plurality of at least partially spaced immobilized liquid membranes disposed in generally parallel surface-to-surface array to define both a first group of flow volumes and a second group of flow volumes alternating between the first group. Screens for spacing apart adjacent membranes are disposed in each of the flow volumes of at least one of the flow volume groups. Frames define the periphery of the flow volumes and flow passages provide separate access to and egress from the flow volumes in the two groups. Structure is provided for contacting fresh membrane liquid with first regions of the membranes. The structure is preferably a wall defining a chamber into which the first regions extend.

22 Claims, 12 Drawing Figures

PACKAGED MEMBRANE SYSTEM AND REPLENISHMENT METHOD

This is a continuation-in-part of copending application for U.S. Patent Ser. No. 806,845, filed June 13, 1977, and now abandoned.

This invention relates to a new improved packaged membrane system including a plurality of immobilized liquid membranes. This invention further relates to a method for restoring or substantially maintaining the separation efficiency of an immobilized liquid membrane.

In U.S. Pat. No. 4,089,653, incorporated herein by reference, Ward discloses a method of selectively removing a predetermined gas from a mixture of gases, comprising contacting a first immobilized liquid membrane with the mixture to allow facilitated transport of the predetermined gas (e.g., hydrogen sulfide) through the first membrane to a hydrophobic porous gas-permeable barrier, passing gases emerging from the first membrane through the gas-permeable barrier, and contacting a second immobilized liquid membrane with gases emerging from the gas-permeable barrier to allow facilitated transport of the predetermined gas through the second membrane. The Ward method is particularly suited for removing hydrogen sulfide from a mixture of gases, e.g., coal gas, including hydrogen sulfide and carbon dioxide. As described in the Ward patent, a particularly suitable immobilized liquid membrane (ILM) for selectively removing hydrogen sulfide is an aqueous alkaline solution of potassium carbonate and potassium bicarbonate disposed in a microporous matrix layer of hydrophilic composition. Although the Ward method is a substantial advance in the art, it has been found that contact of coal gas with the immobilized liquid membrane results in deactivation of the membrane liquid. Such deactivation is believed to result from reaction of oxygen contained in the coal gas with hydrogen sulfide in the liquid membrane to form acidic sulfur oxides such as sulfites, sulfates, and thiosulfates, which neutralize the alkaline carbonate/bicarbonate active species of the aqueous membrane liquid. Accordingly, there is a substantial need in the art for a method and apparatus by which the hydrogen sulfide separation efficiency or selective permeability may be maintained.

In U.S. Pat. No. 3,819,806, incorporated herein by reference, Ward et al. disclose an improved method for selectively separating hydrogen sulfide from a mixture of gases (e.g., coal gas) containing hydrogen sulfide and carbon dioxide wherein there is employed an immobilized liquid membrane containing carbonate/bicarbonate solution. A similar deactivation problem and need for method and apparatus to regenerate the immobilized liquid membrane exist in connection with the method of the patent to Ward et al.

In U.S. Pat. No. 3,564,819, incorporated herein by reference, Neulander et al. disclose a packaged membrane system having a plurality of spaced membranes (which may be immobilized liquid membranes) disposed in generally parallel surface-to-surface array to define both a first group of flow volumes and a second group of flow volumes alternating between the first group, (b) spacing means for the membranes disposed in each of the flow volumes of at least one of the first and second flow volume groups, (c) means for defining the periphery of each of the flow volumes, and (d) means for separate access to and egress from the plurality of flow volumes in the first group and in the second group of flow volumes. If the Neulander et al. packaged membrane system is attempted to be employed for carrying out the process of either the above-referenced Ward et al. patent or the Ward copending application, for removal of hydrogen sulfide from carbon dioxide-bearing coal gas, the problem of maintaining hydrogen sulfide permeability in the immobilized liquid membranes becomes particularly difficult due to the inaccessibility of the membranes in the packaged membrane system. Accordingly, there is a substantial need in the art for method and apparatus whereby immobilized liquid membranes disposed in the Neulander et al. type apparatus may be regenerated.

It has now been found by practice of the present invention that these and other difficulties of the prior art methods and membrane packages are overcome in simple efficient manner.

Generally stated, in one aspect, the present invention provides an improvement in the method for removing a component from a fluid mixture, wherein the mixture is contacted with a first major surface of a membrane containing an immobilized liquid of known or ascertainable initial composition to effect transport of the component through the membrane from the contacted surface to and through an opposite major surface of the membrane, the contact resulting in deactivation of the liquid in the membrane, the improvement for substantially maintaining the separation efficiency of the membrane comprising introducing fresh liquid into a first region of the membrane to effect emission or removal of at least partially deactivated liquid from a second region of the membrane, the fresh liquid being of the initial composition.

Generally stated, in another aspect, the present invention provides an improvement in a packaged membrane system having (a) a plurality of at least partially spaced immobilized liquid membranes disposed in generally parallel surface-to-surface array to define both a first group of flow volumes and a second group of flow volumes alternating between the first group, (b) means for spacing apart adjacent membranes, the means being disposed in each of the flow volumes of at least one of the first and second flow volumes groups, (c) means for defining the periphery of each of the flow volumes, (d) means for separate access to and egress from the plurality of flow volumes in the first group and in the second group of flow volumes, the improvement comprising, in combination with the above, means for contacting fresh membrane liquid with first regions of said membranes to introduce the fresh liquid into such regions.

Practice of the present invention will become more fully apparent by having reference to the following detailed description taken in conjunction with the accompanying drawings, wherein:

FIG. 5 is an enlarged view of a disk useful for partially separating adjacent membranes and for providing either access to or egress from flow volumes defined principally by the spacing means;

FIG. 6 is a section taken on line 6—6 of FIG. 5;

Although the improved packaged membrane system of the present invention may be applied to gas separation devices, gas concentrator devices, blood oxygenators, liquid separation devices and the like, the utilization thereof for the preparation of gas separation devices will be described by way of example.

Figure 1:
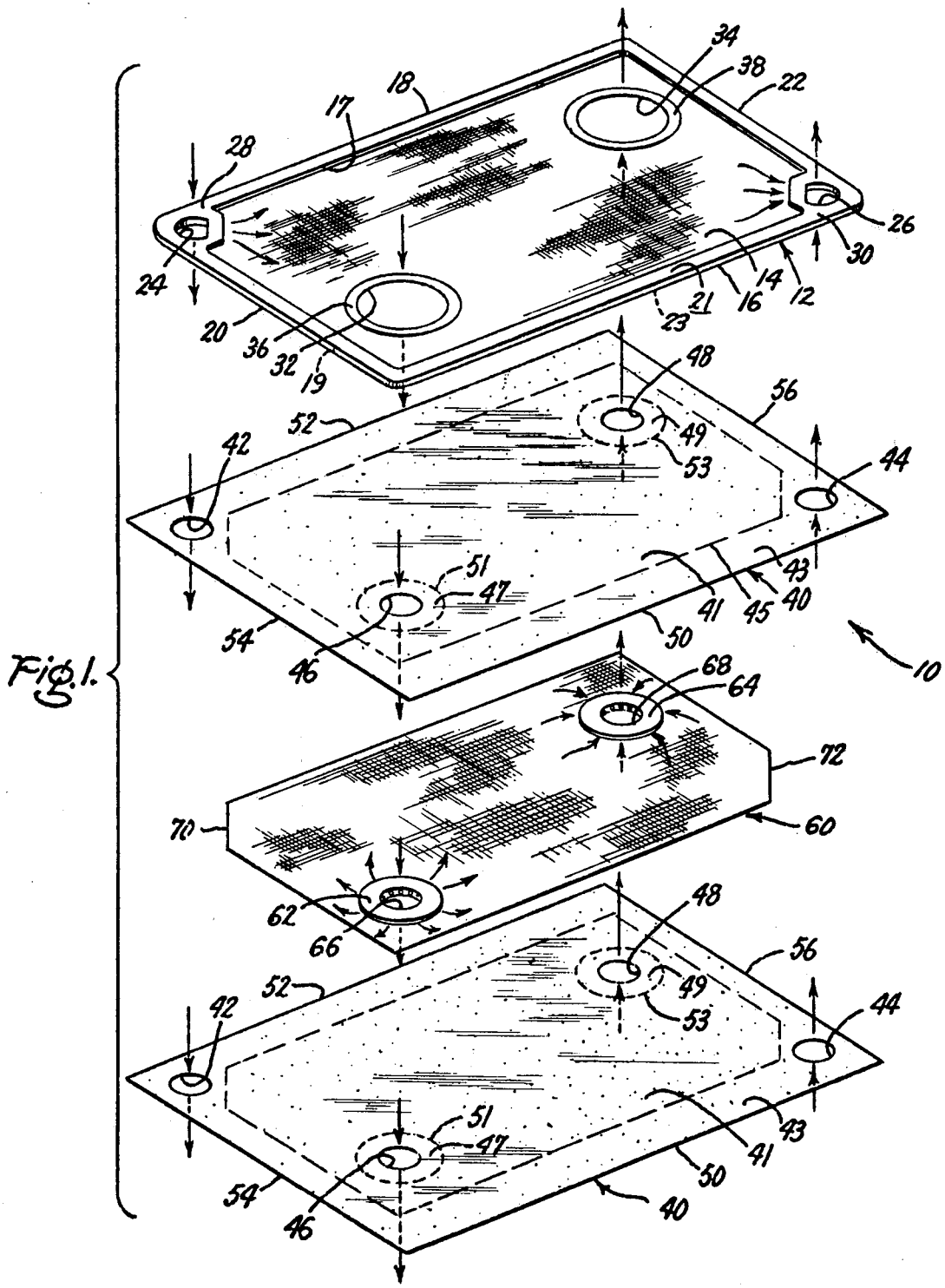
FIG. 1 is an exploded perspective view of a repeating unit of a packaged membrane system embodying the present invention, showing a layer of membrane spacing means, a first membrane, a second layer of membrane spacing means, and a second membrane.

Referring now to the drawing and particularly to FIG. 1, there is shown repetitive stack arrangement 10 which includes generally rectangular gas-tight closed loop frame 12 securing separator screen 14 therein, membrane 40, a pair of spaced generally coplanar disks 62 and 64 received through holes in optionally included separator screen 60, and the next membrane 40.

Preferably, separator screens 14 and 60 are woven screens e.g. polyester or nylon monofilament screen cloth having mesh openings in the range of about 20 microns to about 1200 microns and an open area ranging from about 35 to 55 percent. Other sizes of mesh openings and percentages of open area may be used depending upon the strength of the membranes employed, the pressure difference prevailing across the membrane and the criteria to be set for fluid flow through the screens. Screens prepared from other materials may be employed so long as the material is capable of retaining its structural integrity under the operating conditions and is compatible with the fluids employed.

In a gas separation device, imperforate membranes that permit certain specific gases or vapors to pass therethrough to the substantial exclusion of others would be employed. The preparation of such membranes is disclosed in U.S. Pat. No. 3,396,510-Ward et al. and U.S. Pat. No. 3,335,545-Robb et al. In addition, excellent capability for resisting pressure differential has been obtained with immobilized liquid membranes in which the liquid is lodged in the pores of a microporous layer made of a material wet by the liquid used. By way of example, an immobilized liquid membrane was prepared by impregnating a 5 mil thick sheet of filter material sold under the trademark "Solvinert" (0.25 micron nominal pore size) with a saturated cesium bicarbonate aqueous solution. Tests have shown that the bubble point (the pressure needed to dislodge the liquid from the pores) for this material is at least 30 p.s.i., if the Solvinert is soaked in cesium bicarbonate solution containing a small concentration of wetting agent soluble in the system, e.g. 1% by weight of low molecular weight (400-1000) polyethylene glycol. This material (Solvinert) appears under infrared analysis to be a terpolymer of polyvinyl alcohol, polyvinyl chloride and polyvinyl acetate.

Other membrane materials useful as immobilizing mediums for various liquids wet thereby include the ultrafine porous polymer membrane disclosed in U.S. patent application Ser. No. 717,893-Weininger et al. (filed Apr. 1, 1968 and now abandoned and assigned to the assignee of the instant invention) and the materials described in U.S. Pat. Nos. 3,378,057, Sargent et al.; 2,984,869, Honey et al.; 3,351,489, Larson et al.; 3,216,882, Feldt et al., and 3,062,760, Dermody et al. The disclosures of the aforementioned patent application and patents are incorporated herein by reference in their entirety.

Frame 12 includes opposite side frame portions 16 and 18 connected at ends thereof by end frame portions 20 and 22, which may be integrally formed with the sides as by injection molding the frame about the edge of screen 14. The frame is provided with spaced through-holes 24 and 26 preferably passing through first diagonally opposite frame corners 28 and 30 respectively, the holes extending from loop face 21 to opposite loop face 23 (appearing as a line in FIGS. 1 and 3). The faces extend from frame inner periphery 17 to frame outer periphery 19. Frame channel means having at least one and preferably a plurality of channels 25 and 27 (FIGS. 2, 3 and 4) extend respectively from frame through-holes 24 and 26 to proximate portions of inner periphery 17.

Screen 14 is provided with spaced diagonally opposite through-holes 32 and 34 for receiving disks 62 and 64 proximate second diagonally opposite corners of the frame. The screen may have hole-defining reinforcing rings 36 and 38 disposed about the screen holes. If included, the rings are preferably of substantially the same thickness as the thickness of the screen 14.

Figure 2:
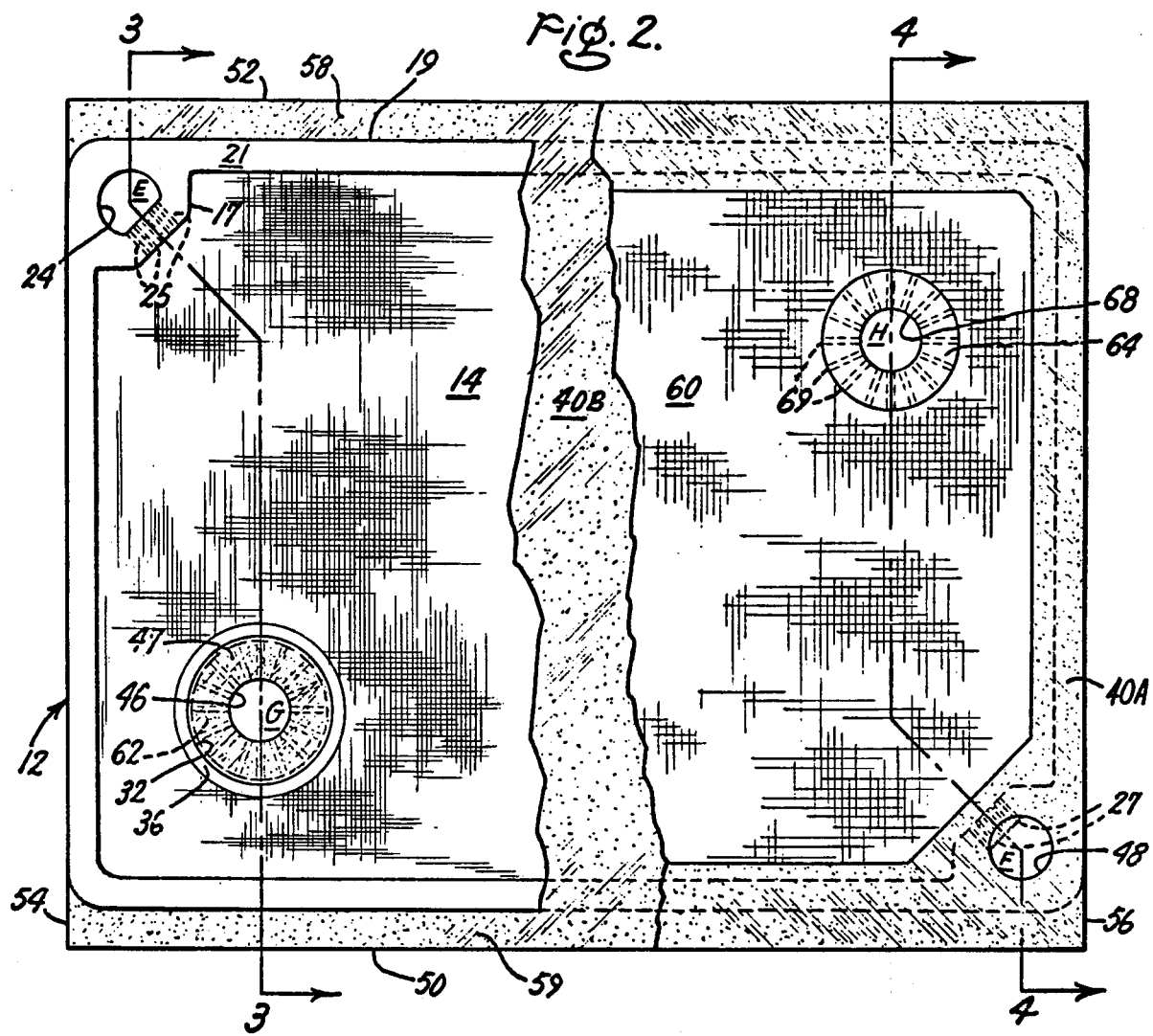
FIG. 2 is a plan view of the repeating unit with portions thereof removed showing underlying portions thereof.
Figure 3:
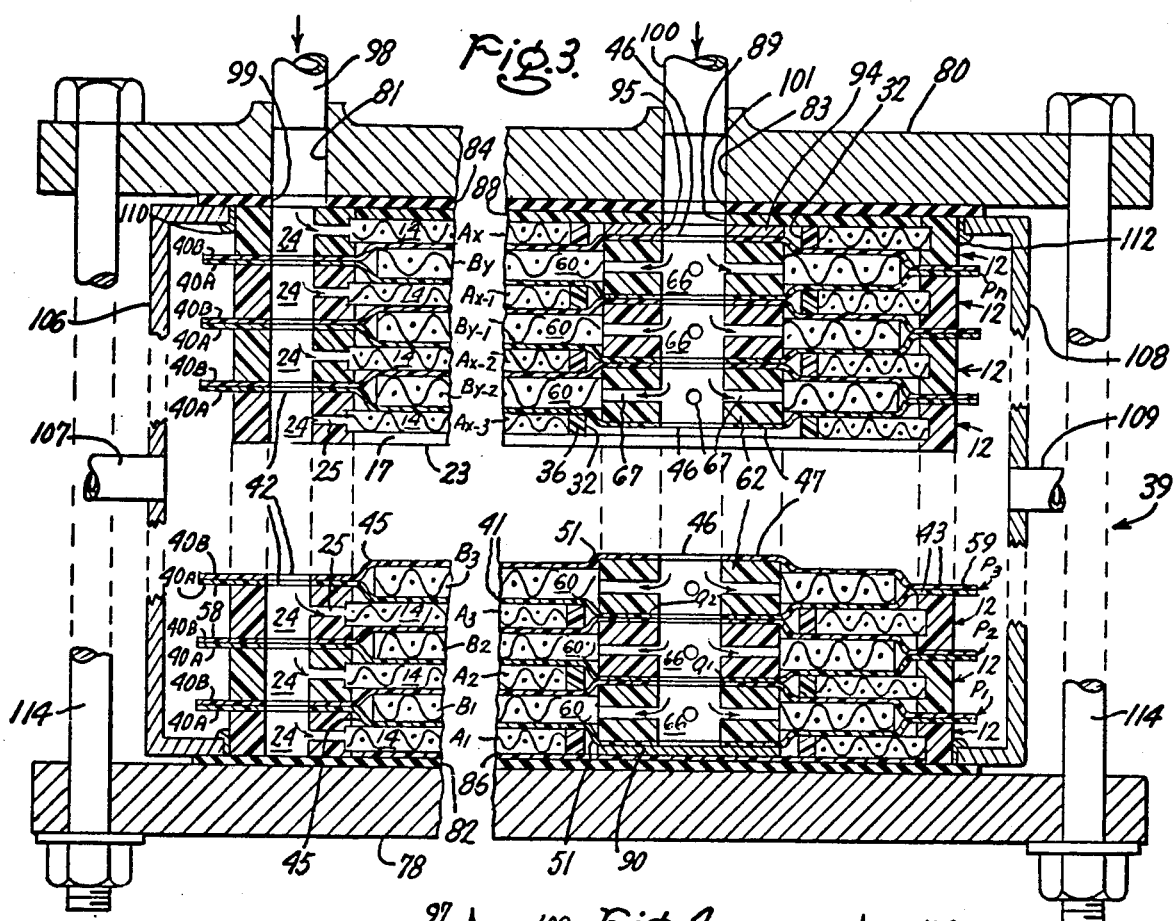
FIG. 3 is a section of the system with the repeating unit section taken on line 3—3 of FIG. 2.
Figure 4:
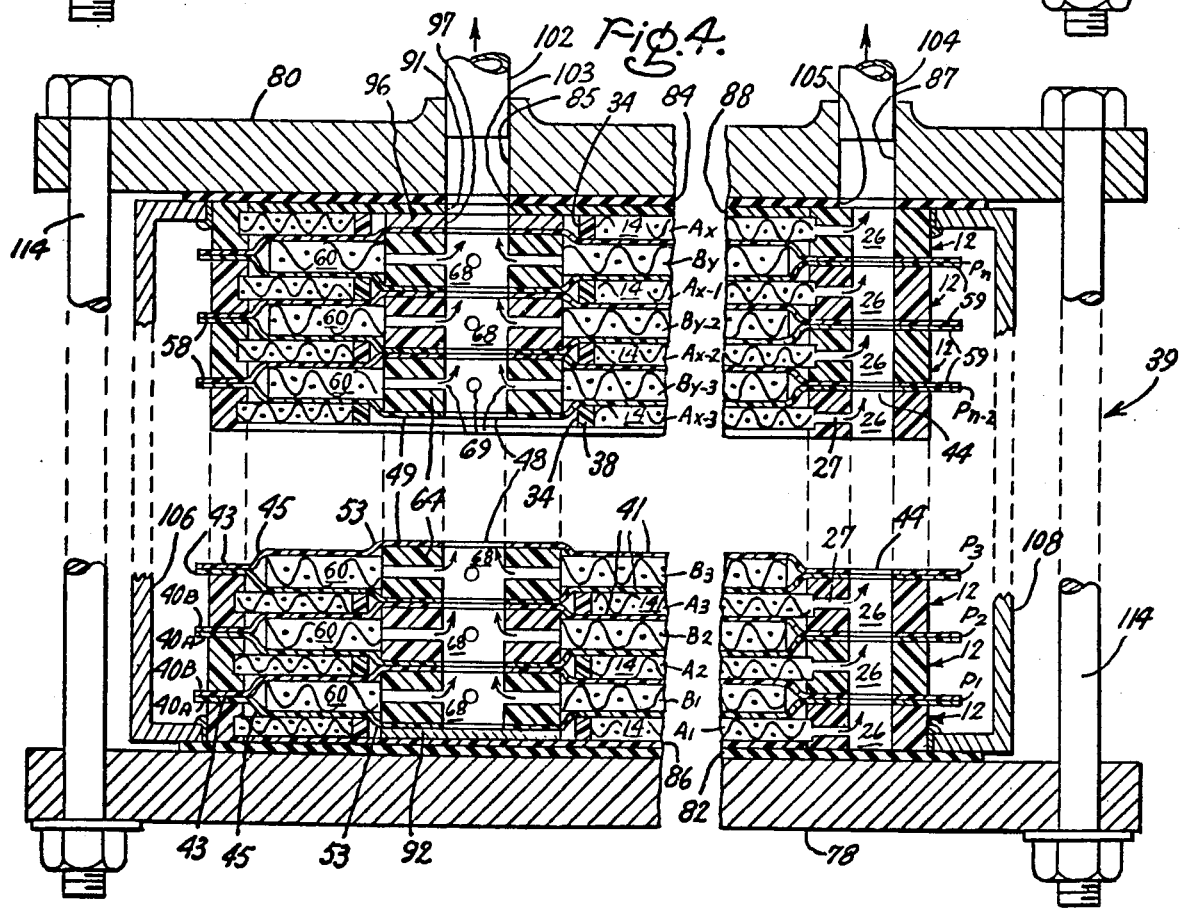
FIG. 4 is a section of the system with the repeating unit section taken on line 4—4 of FIG. 2.
Figure 7:
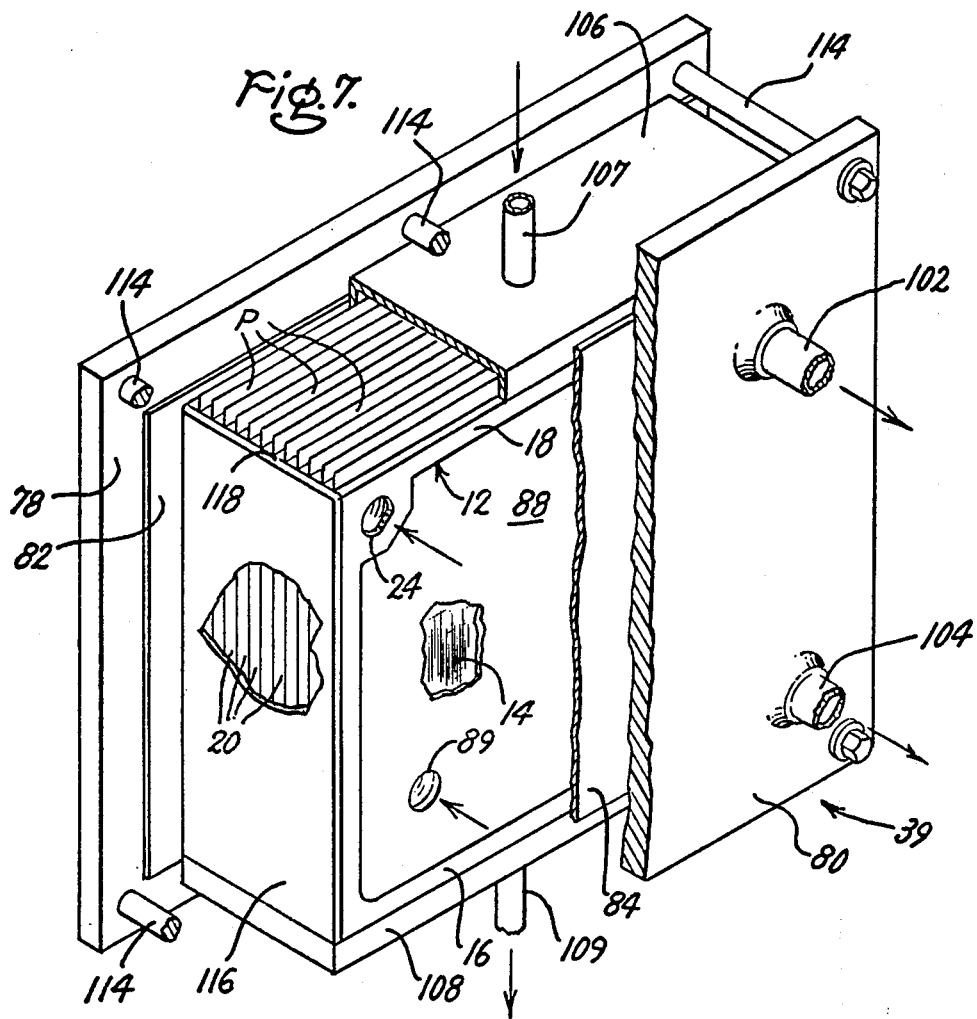
FIG. 7 is a perspective fragmentary view of the packaged membrane system with compression means shown.

As will become more apparent below, each membrane 40 is slightly deformed from planar configuration in the preferred packaged membrane system 39 (FIGS. 3, 4 and 7). However, prior to assembly in the system, the membranes may be generally planar and are so illustrated in FIG. 1. As illustrated therein, each generally rectangular membrane 40 includes side edges 50 and 52 connected by end edges 54 and 56. In the preferred embodiment, the lateral extent of membrane edges 54 and 56 is greater than the lateral extent of frame edges 20 and 22 respectively so that the packaged membrane system includes membrane regions 58 and 59 (FIG. 2) extending beyond the outer or external periphery of the frames on sides 16 and 18 thereof, whereby the extending membrane regions are in communication with the exterior of the system. Broken lines 45, 51 and 53 (FIG. 1) schematically illustrate narrow shoulders or elevation transition zones which are formed in the membrane during subsequent assembly of the packaged membrane system. Broken line 45 divides the membrane into inner portion 41 and closed-loop outer portion 43 surrounding the inner portion. The outer portion is provided with an outer pair of spaced diagonally opposite through-holes 42 and 44 proximate opposite corners thereof for alignment with frame through-holes 24 and 26 respectively. The inner portion is provided with an inner pair of spaced diagonally opposite through-holes 46 and 48 proximate opposite corners thereof for preferably coaxial alignment with disks 62 and 64 respectively, the inner pair of holes being surrounded by annular membrane margins 47 and 49 which are defined by the inner holes and broken lines 51 and 53 respectively.

The outer periphery of separator screen 60, which is optionally but preferably included, preferably is slightly smaller than and subtantially identical in shape to the inner periphery of the frame, as shown more clearly in FIG. 2. Screen 60 preferably includes diagonal edges 70 and 72 defining truncated opposite corners thereof for improved matching with frame screen 14 in the packaged membrane system.

Annular disk 62 is in spaced generally coplanar arrangement with annular disk 64 to define a pair of generally coplanar disks, each disk being received through a corresponding hole in screen 60 and secured in engagement with the screen by any suitable means, e.g. pressure fitting. Disk 62 (shown in greater detail in FIGS. 5 and 6) is provided with through-hole 66 extending from disk face 74 to opposite generally parallel disk face 76 and with disk channel means including at least one channel and preferably a plurality of channels 67 extending radially from through-hole 66 to an outer periphery of the disk. Similarly, disk 64, which may be of like size, shape, and construction, is provided with through-hole 68 and at least one channel illustrated by a plurality of channels 69 radially extending from the through-hole to the disk outer periphery. Disks 62 and 64 are disposed for alignment of the through-holes thereof with the inner pair of holes 46 and 48 through the membrane inner portion.

The relationship of the various components of the assembled repeating stack arrangement 10 is shown more clearly in FIGS. 2, 3 and 4. When assembled, the various adjacent initially planar membranes become deformed in opposite directions, resulting in a first set of membranes 40A, which are generally concave in one direction (upwardly in FIGS. 3–4), alternating between a second set of membranes 40B, which are generally concave in an opposite direction (downwardly in FIGS. 3–4). In FIG. 2 a right-side portion of the assembly of frame 12 and screen 14 is removed to show a portion of underlying membrane 40B, a rightside portion of which is removed to show underlying separator screen 60 and disk 64. The latter screen and disk in turn overlie the next membrane 40A. Margin 47 of membrane 40B is visible in screen hole 32 surrounded by ring 36, the margin overlying disk 62 (the outer periphery of which is shown by a broken circular line in FIG. 2). The diameters of holes 32 and 34 in screen 14 are slightly larger than the outer diameters of disks 62 and 64, respectively.

FIGS. 3 and 4 (and FIG. 7 rotated 90° therefrom) illustrate improved packaged membrane system 39 including a plurality of repeating units 10 (FIG. 1). The thickness of screen 14 is less than the thickness of frame 12, while the thickness of screen 60 is less than the thickness of the disks 64 and 66. Each disk and the frame may be identical in thickness. However, as a general preference, the frame thickness is slightly less than the disk thickness to aid in ensuring that replenishment liquid supplied to region 58 of the membrane will flow through the membrane outer portion disposed between adjacent frames when the system is under compressive forces as described hereinafter. Desirably, the thickness of the frame and each disk is substantially equal to the sum of the screen 14 thickness, the screen 60 thickness, and two membrane thicknesses. Frame loop faces 21 and 23 are preferably equally distant from the screen 14, thereby providing shallow cavities on opposite sides of the screen. In packaged membrane system 39, the assembled repeating units 10 are sandwiched between metal end plates 78 and 80 with gaskets 82 and 84 of preferably resilient material, e.g. rubber, therebetween. The lower cavity of the lowermost frame and the upper cavity of the uppermost frame are provided with sheets 86 and 88, respectively, preferably of plastic material, e.g. polypropylene. The group of disks 62 is provided with spacers 90 and 94 adjacent lower and upper extremities thereof, while the group of disks 64 is provided with spacers 92 and 96 adjacent lower and upper extremities thereof. The number of disks in each vertically aligned disk group is equal to one less than the number of frames employed in the system.

The thickness of the spacers is preferably such that the opposite faces of each disk are equidistant from the nearest plane of interfacial membrane-to-membrane contact in the membrane outer portions.

The packaged membrane system may be more fully understood by considering the preparation thereof. Initially, sheet 86 is placed on lower gasket 82, which in turn is supported by lower pressure plate 78. Thereafter, a first frame 12 is laid on the lower gasket with the frame-contained screen 14 aligned with the sheet 86. Next, spacers 90 and 92 are placed concentrically within screen holes 32 and 34, respectively. Next, a first membrane 40 is placed over the frame such that opposite side regions 58 and 59 of the membrane extend beyond opposite frame sides 16 and 18, with the outer pair of membrane holes 42 and 44 located immediately above and in alignment with frame holes 24 and 26, respectively. Screen 60 is thereafter pressed on the first membrane so that disks 62 and 64 are inserted partially and concentrically within holes 32 and 34, respectively, of screen 14. The first placed membrane now appears with shoulders 45, 51 and 53 formed therein as shown by the configuration of lowermost membrane 40A in FIGS. 3 and 4. A next membrane 40B is thereafter positioned on screen 60 such that its opposite regions 58 and 59 extend beyond the frame in like manner as described above for the first placed membrane 40A. Inner holes 46 and 48 of membrane 40B are now in coaxial alignment with holes 66 and 68 of disks 62 and 64 respectively, and outer holes 42 and 44 are in coaxial alignment with frame outer holes 24 and 26 respectively. After laying down the next frame 12 with screen 14 secured therein, the first laid down membrane 40B assumes the generally concave downward configuration shown therefor in FIGS. 3 and 4. The sequence is repeated until a desired number of stacks or units are assembled. Each frame is placed in generally parallel surface-to-surface alignment with the previously laid down frame. Likewise, each disk 62 and each disk 64 are placed in generally parallel surface-to-surface array and in coaxial alignment with the previous disks 62 and 64, respectively, thereby forming a plurality of vertically aligned disks in each of two spaced apart disk groups.

After the last frame has been laid down, spacer 94 provided with hole 95 is placed on the uppermost membrane 40B above the group of disks 62 and concentrically within the uppermost screen hole 32, the spacer hole 95 thereby being aligned with hole 46 in the uppermost membrane. In like manner, spacer 96 having hole 97 passing centrally therethrough is placed on the uppermost membrane 40B above the group of disks 64 and concentrically within screen hole 34, thereby aligning spacer hole 97 with inner hole 48 in the uppermost membrane. Next, sheet 88 is placed on the uppermost screen 14 to fill the upper cavity of the uppermost frame, with holes 89 and 91 provided in the sheet being in alignment with spacer holes 95 and 97 respectively. Thereafter, upper gasket 84 is laid atop the sheet 88 and the uppermost frame such that gasket through-holes 99, 101, 103, and 105 are in alignment with frame hole 24, frame hole 26, spacer hole 95, and spacer hole 97, respectively. Thereafter, metal end plate 80 is positioned atop gasket 84 such that plate through-holes 81, 83, 85 and 87 are in alignment with gasket holes 99, 101, 103, and 105, respectively. Conduits 98, 100, 102, and 104 are received in plate holes 81, 83, 85, and 87, respectively. Fasteners 114 arranged around the perimeter of the packaged membrane system, as shown in FIGS. 3, 4, and 7, provide biasing force for the end plates whereby the frames and both groups of disks may be placed under compression.

Thereafter, a layer of potting compound is applied to opposite ends 20 and 22 of the frames and allowed to harden. Layer 116 of potting compound is shown at ends 20 in FIG. 7. The opposite layer, hidden from view, may be substantially identical to layer 116. Thereafter, the liquid supply chamber defined by wall 106 having conduit 107 received in a hole therethrough is secured to the outermost frames. The cover may be secured to the rest of the structure by any suitable sealing means such as bead 110 of adhesive (FIGS. 3 and 4). In similar manner the liquid emission chamber defined by wall 108 having conduit 109 received in a hole therethrough is secured to the lower end of the stack.

As illustrated in FIGS. 3-4 each pair of adjacent membranes in the system has a separator screen 14 or 60 between the membrane inner portions 41. These spaced inner portions 41, which are disposed in generally parallel surface-to-surface array, generally define both a first group A of flow volumes $A_1, A_2, \ldots A_x$, and a second group B of flow volumes $B_1, B_2, \ldots B_y$ alternating between flow volume group A. The outer extremities of flow volumes $A_1$ and $A_x$ are defined by the sheets 86 and 88 respectively. The frames 12 generally define the periphery of each of the flow volumes in groups A and B. The frame through-holes 24 and holes 42 through the membrane outer portions are in alignment to define access flow passage E (FIG. 2) communicating with each flow volume in flow volume group A through the plurality of frame channels 25. In like manner, frame through-holes 26 and membrane outer holes 44 are in alignment to define egress flow passage F (FIG. 2) communicating with each flow volume in flow volume group A through the plurality of frame channels 27.

As shown in FIG. 3, the through-holes 66 in the plurality of disks 62 constituting a first group of vertically aligned disks and the holes 46 in the membrane inner portions are in alignment to define in combination access flow passage G (FIG. 2) communicating with the flow volumes in flow volume group B through the plurality of disk channels 67. In like manner, the holes 68 through the plurality of disks 64 constituting a second group of vertical aligned disks and the holes 48 in the membrane inner portions are in alignment to define in combination an egress flow passage H (FIG. 2) communicating with the group of flow volumes B through the plurality of disk channels 69. FIGS. 3 and 4 taken together show that each flow volume in flow volume group B has a coplanar pair of disks 62 and 64 disposed therein.

Each membrane of the set of membranes 40A is in interfacial contact over some portion of its area with opposite membranes of the set of membranes 40B to define pairs of contacting membrane portions. The areas are the outer portions 43 and the margins 47 and 49. More particularly, the outer portion 43 of any given membrane 40A is in interfacial contact on one major surface or side of the membrane with the outer portion 43 of a first adjacent membrane of the set of membranes 40B to define one of the pairs $P_1, P_2 \ldots P_n$ (FIGS. 3-4) of the group P of contacting outer portion pairs. The margin 47 of the given membrane 40A is in interfacial contact on an opposite side of the membrane with the margin 47 of a second adjacent membrane of the set of membranes 40B to define one of the pairs $Q_1, Q_2 \ldots$ etc. (FIG. 3) of a group Q of contacting margins. Similarly, the margin 49 of the given membrane 40A is in interfacial contact on the last mentioned opposite side with the margin 49 of the second adjacent membrane 40B to define one of the pairs $R_1, R_2 \ldots$ etc. (FIG. 4) of a group R of contacting margins. Each of the pairs P of contacting outer portions 43 is disposed between a pair of adjacent frames. Each of the pairs Q of contacting margins 47 is disposed between a pair of adjacent disks 62, and each of the pairs R of contacting margins 49 is disposed between a pair of adjacent disks 64.

Tightening of the fasteners 114 creates compressive forces which seal the gaskets against the metal plates and outer frames and seal the membrane interface between each of the contacting outer portions, while at the same time placing each pair of adjacent frames into sealing engagement with the outer membrane surfaces of the pair of contacting outer portions disposed therebetween. Such compression also creates seals between the successive interfaces between end plate 78, gasket 82, sheet 86, spacer 90, lowermost membrane 40A, and the lowermost disk 62, and at the same time seals the successive interfaces between end plate 80, gasket 84, sheet 88, spacer 94, and the uppermost membrane 40B to seal flow passage G extending through disks 62. With spacer 96 substituted for spacer 94 a similar interfacial sealing is effected for flow passage H associated with disks 64. Such compression also seals the membrane interfaces between each of the contacting margins 47 and 49, and places each pair of adjacent disks into sealing engagement with the outer membrane surfaces of the pair of contacting margins disposed therebetween. The compression-sealed frames define the periphery of the flow volumes in groups A and B and provide gas-tight walls peripherally of the packaged membrane system.

In operation a flow of feed gas entering through conduit 98 is conducted by flow passage E through the plurality of frame channels 25 into the alternate flow volumes $A_1, A_2 \ldots A_x$ of flow volume group A. This feed gas sweeps over the major surfaces of adjacent membranes forming the boundaries of the flow volumes of group A and enters flow passage F through frame channels 27 and exists the system through conduit 104, as shown in FIGS. 3 and 4. Simultaneously, the sweep fluid stream enters conduit 100 and is conducted by flow passage G through disk channels 27 into flow volumes $B_1, B_2 \ldots B_y$, passing over other major surfaces of the membranes and through disk channels 69 into flow passage H and exiting the system through conduit 102, thereby effecting facilitated transport of a gaseous component from the feed gas through the membrane into the sweep fluid.

Prior to being placed into operation, the various immobilized liquid membranes include liquid of known or ascertainable initial composition, e.g., 30% aqueous $K_2CO_3$ for selective removal of $H_2S$ from a mixture containing $H_2S$ and carbon dioxide. The problem of in-process deactivation of such liquid composition in the immobilized liquid membrane may be substantially overcome by the method of this invention, which in an embodiment includes introduction of fresh liquid of such initial composition into regions 58 of the membranes extending beyond the periphery of the frames to effect emission of at least partially deactivated liquid from regions 59 extending beyond opposite sides of the frames. In the embodiment packaged membrane system illustrated in FIG. 3, such fresh liquid may be added through conduit 107, under superatmospheric pressure if desired, into chamber 106 which serves to introduce the fresh liquid into the various immobilized liquid membrane regions 58 extending into the chamber. Typically, the introduced liquid flows between the first and second major surfaces through at least a major portion of the membrane, the surfaces being generally parallel one to the other, and the direction of the flow being generally parallel to the surfaces. Such introduction and flow effects emission or removal of typically at least partially deactivated liquid from the second regions 59 through chamber 108 and exiting therefrom via conduit 109.

If desired, appropriate pumps and valves may be used to maintain the liquid pressure in the exit chamber 108 at a superatmospheric pressure or at any other pressure above the highest pressure of the feed gas and the sweep fluid, which may be liquid or gaseous as desired. As shown in FIG. 7, the packaged membrane system may be oriented with the supply chamber 106 in an upper position with emission chamber 108 in an opposite lower position and flow of the fresh liquid is effected simply by gravitational forces. For simplicity, the extending membrane outer portion pairs P are shown in FIG. 7 as integral units.

Preferably, fresh liquid is continually introduced simultaneously with passage of feed gas through the packaged membrane system.

If screens 60 are omitted, a positive pressure drop from flow volume group B to flow volume group A should be employed.

Figure 8:
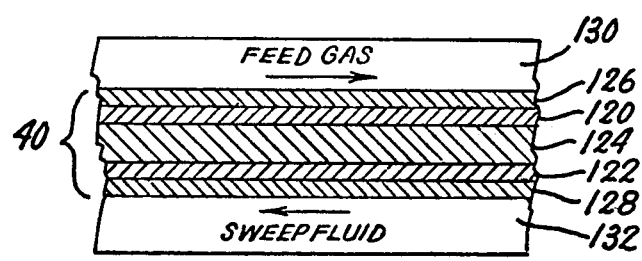
FIG. 8 is a detailed fragmentary section view of a composite membrane including at least two immobilized liquid membrane layers separated by a gas-permeable barrier.

Each membrane 40 may be a single immobilized liquid membrane (ILM) or a composite membrane including two or more ILM layers with a gas-permeable barrier layer disposed between each pair of adjacent ILM layers. FIG. 8 illustrates such a composite membrane or membrane assembly including ILM layers 120 and 122 separated by gas-permeable barrier layer or membrane 124. The composite or assembly may further include either or both of gas-permeable barrier layers or membranes 126 and 128 disposed on outer sides of the ILM layers. In a suitable composite membrane for separating $H_2S$ from $CO_2$-bearing coal gas, the ILM's are composed of a potassium carbonate/potassium bicarbonate aqueous solution and the gas-permeable barrier layer 124 is of a hydrophobic microporous material exhibiting high permeability to gases relative to ILM's. A suitable hydrophobic material is Teflon, a trademark of E. I. duPont de Nemours & Company for fluorinated hydrocarbon polymers, typically of the type designated GORE-TEX, a trademark of W. L. Gore and Associates, Inc. FIG. 8 also schematically shows flows of feed gas and sweep fluid along opposite outer surfaces of the composite membrane. If the sweep fluid is a liquid, inclusion of hydrophobic gas-permeable layer 128 provides an additional functional gas barrier. In-coal gas service, membrane layer 126 aids in keeping the ILM's free of coal dust and tar.

Figure 9:
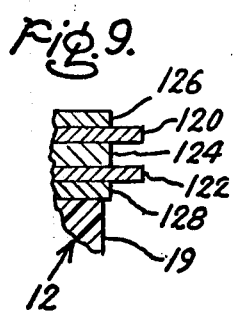
FIG. 9 is a detailed fragmentary section view of an end region of the composite membrane in communication with the exterior of the system.

As shown in detailed fragmentary view (FIG. 9), in the region of the composite membrane (shown in FIG. 8) extending beyond the outer periphery 19 of frame 12, the immobilized liquid membrane layers 120 and 122 extend beyond the hydrophobic gas-permeable barrier layers 124, 126, and 128 for improved efficiency of introduction of fresh membrane liquid. Thus, portions of opposite major surfaces of the immobilized liquid membrane layers 120 and 122, as well as the edges thereof, are accessible for fresh liquid introduction.

Figure 10:
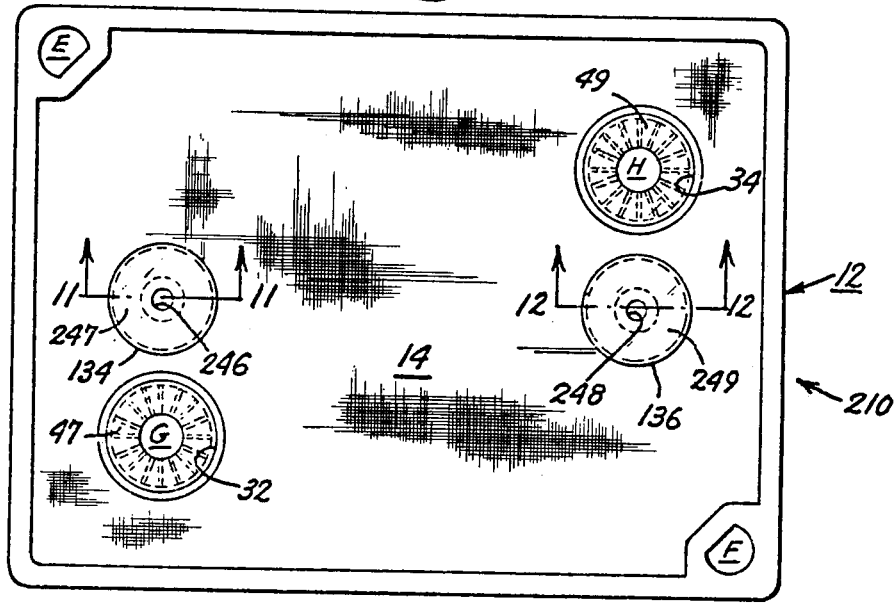
FIG. 10 is a plan view of another embodiment of the repeating unit.

In another embodiment, the improved packaged membrane system of the present invention includes a plurality of two or more repeating stack units 210 (FIGS. 10–12), which may be substantially identical to the above-described stack units 10 except as hereinafter provided. In this embodiment first regions 258 of the membranes are in flow communication with the exterior of the system through flow passage I for introduction of fresh liquid into the membranes and second regions 259 of the membranes are in communication with the exterior of the system through flow passage J for emission or removal of typically at least partially deactivated liquid from the system. Membrane regions extending beyond the frames are not required in this embodiment. Each screen 60 is provided with a pair of spaced apart annular solid disks 262 and 264 having axial through-holes 266 and 268 extending from first to second opposite faces of the disks. Each screen 14 is further provided with spaced holes 134 and 136 which are slightly larger in diameter than the outer diameters of solid annular disks 262 and 264 respectively. The inner portion of each membrane 40 is provided with an additional inner pair of spaced through-holes 246 and 248 for preferably coaxial alignment with disk through-holes 266 and 268 respectively, the inner pair of additional holes being surrounded by annular membrane margins 247 and 249. The membranes are interleaved between the solid annular disks in substantially the same manner as the membranes are interleaved between disks 62 and 64 in the above description. The diameters of membrane inner holes 246 and 248 are preferably less than the inner diameters of disk through-holes 266 and 268, respectively, whereby ring-shaped regions 258 and 259 of each membrane (the ring-shaped regions being the innermost portions of the annular margins 247 and 249) extend into the corresponding flow passages I and J defined principally by the coaxially aligned disk through-holes 266 and 268.

Figure 11:
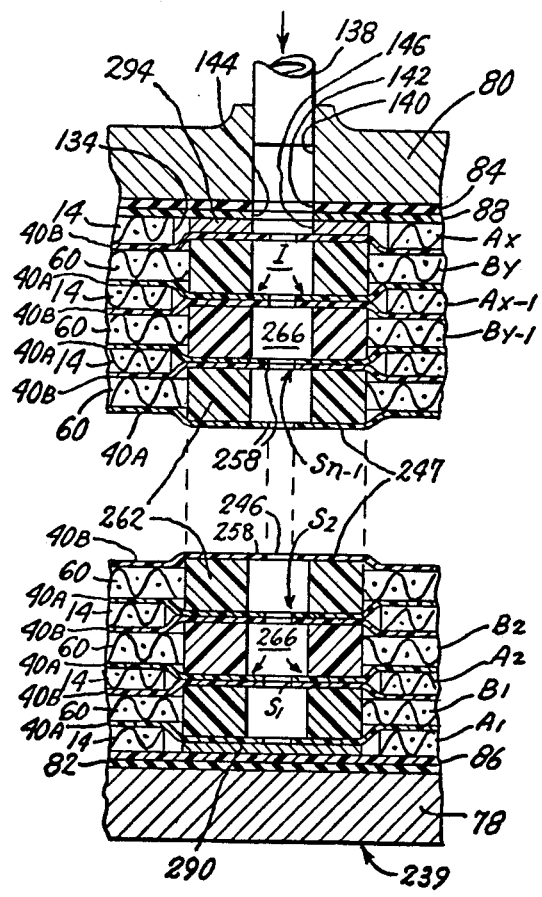
FIG. 11 and FIG. 12 are fragmentary section views of another embodiment of the system with the repeating unit sections taken on lines 11—11 and 12—12, respectively, of FIG. 10.
Figure 12:
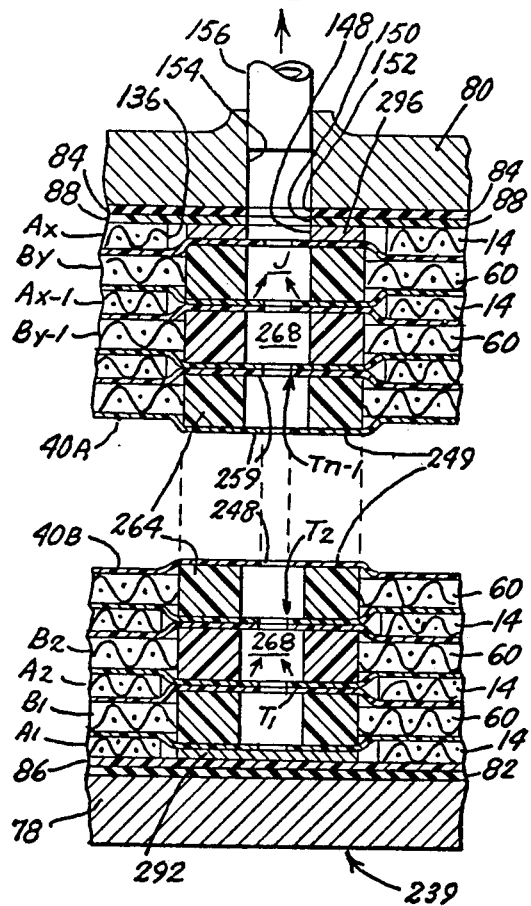

As shown in FIG. 11, through-holes 266 in the plurality of disks 262 constituting a first group of vertically aligned solid annular disks and the holes 246 in the membrane inner portions are in alignment to define in combination the fresh membrane liquid access flow passage I (FIGS. 10–11) communicating with the membrane regions 258 for introduction of fresh or replenishment liquid. In like manner, the holes 268 in the plurality of solid annular disks 264 constituting a second group of vertically aligned disks and the holes 248 in the membrane inner portions are in alignment to define in combination the egress flow passage J (FIGS. 10 and 12) communicating with the membrane regions 259 for emission or removal of typically at least partially deactivated liquid.

In operation, a flow of replacement or fresh membrane liquid enters through conduit 138 and is conducted sequentially through hole 140 in plate 80, hole 142 in gasket 84, hole 144 in sheet 88, and hole 146 in spacer 294 into the flow passage I. The fresh liquid is thus introduced into each membrane through its ring-shaped region 258 and flows between, and in generally parallel relation to, the opposite generally parallel major surfaces of each membrane, wherein the liquid becomes typically at least partially deactivated as, for example, where hydrogen sulfide is being removed from coal gas. The deactivated or partially deactivated liquid exits through regions 259 into flow passage J, exiting therefrom sequentially through hole 148 in spacer 296, hole 150 in sheet 88, hole 152 in gasket 84, hole 154 in end plate 80 into conduit 156 for ultimate emission from the system.

Thus, the fresh liquid introduction and emission or removal of deactivated or at least partially deactivated liquid are substantially concurrent such that substantially no accumulation of liquid is effected in the membranes by the liquid introduction.

If desired, the thickness of disks 262 and 264 may be the same as, or slightly smaller than, the thickness of the disks 62 and 64.

Spacers 290 and 292 serve the same function as spacers 90 and 92.

Group S of pairs $S_1$, $S_2$ ... etc. of contacting membrane margins 247 is substantially similar to the above-described group Q of contacting margins 47. Group T of pairs $T_1$, $T_2$ ... etc. of contacting membrane margins 249 is substantially similar to the above-described group R contacting margins 49. Each of the pairs S is disposed between a pair of adjacent disks 262, and each of the pairs T is disposed between a pair of adjacent disks 264. Application of compressive forces effects membrane-to-membrane and membrane-to-disk seals between pairs of these adjacent disks in the manner described above for system 39.

A feature of this invention is the capability of forcing the frames (or solid disks 262 and 264) into gas-tight sealing contact with the portions of the membranes therebetween and at the same time being able to introduce liquid through the sealed membranes into the membrane inner portions.

Although the present invention has been described above with principal reference to maintaining the separation efficiency of ILM's employed in removing a gaseous component from a gaseous mixture, the invention is applicable to ILM's employed in removing any component from any fluid mixture containing the component dispersed therein. As used herein, the term "fluid mixture" includes liquid mixtures, gaseous mixtures, combinations thereof, and the like. The component may be normally solid or fluid, i.e. liquid or gaseous. Removal of liquid components from liquid mixtures employing a porous membrane containing a liquid solvent is described in Cahn, U.S. Pat. No. 3,244,763, which is incorporated herein by reference. Although the immobilized liquid contained in the membrane employed in this invention may be a one-component liquid composition, e.g. water or other suitable solvent for the component being removed, the membrane is preferably a facilitating membrane. That is, the membrane preferably contains at least one species which is reversibly reactive with the component being removed to effect facilitated transport thereof.

It is to be understood that the foregoing detailed described is given merely by way of illustration and many modifications may be made therein without departing from the spirit or scope of the present invention.

What is claimed is:

1. In a method for removing a component from a fluid mixture, wherein the fluid mixture is contacted with a first major surface of a membrane containing an immobilized liquid of an initial composition to effect transport of said component through said membrane from said first major surface to and through a second major surface of said membrane, said second major surface being opposite said first major surface, the improvement for substantially maintaining the separation efficiency of said membrane which comprises the steps of (a) introducing fresh liquid into a first region of said membrane to effect emission of at least partially deactivated liquid from a second region of said membrane and (b) substantially concurrently with said introduction step removing said deactivated liquid from said second region such that substantially no accumulation of liquid is effected in said membrane by said introduction step, said fresh liquid being of said initial composition.

2. The improvement of claim 1, wherein the introduced liquid flows between said first and second surfaces through at least a major portion of the membrane, said surfaces being generally parallel one to the other and the direction of said flow being generally parallel to said surfaces.

3. The improvement of claim 1, wherein said first region is a first portion of the periphery of said membrane and said second region is a second portion of the periphery of said membrane.

4. The improvement of claim 1, wherein said fresh liquid is continually introduced into said first region and said deactivated liquid is continually removed from said second region.

5. The improvement of claim 1, wherein said first and second regions are spaced substantially apart one from the other.

6. The improvement of claim 1, wherein said fresh liquid is introduced under superatmospheric pressure.

7. The improvement of claim 1, wherein said component is a gaseous component and said mixture is a gaseous mixture.

8. The improvement of claim 7, wherein said membrane is a facilitating transport membrane and the transport effected is facilitated transport.

9. The improvement of claim 8, wherein said gaseous component is hydrogen sulfide and said immobilized liquid is a carbonate/bicarbonate solution.

10. In a method of selectively removing a gaseous component from a gaseous mixture wherein a first membrane containing an immobilized liquid of an initial composition is contacted with said mixture to effect facilitated transport of said gaseous component through said first membrane to a hydrophobic porous gas-permeable barrier; gases emerging from said first membrane are passed through said gas-permeable barrier; and a second membrane containing an immobilized liquid of said initial composition is contacted with gases emerging from said gas-permeable barrier to effect facilitated transport of said gaseous component through said second membrane, the improvement for substantially maintaining the separation efficiency of said first and second membranes, which comprises the steps of (a) introducing fresh liquid into first regions of each of said first and second membranes to effect emission of at least partially deactivated liquid from second regions of each of said first and second membranes, and (b) substantially concurrently with said introduction step removing said deactivated liquid from said second regions such that substantially no accumulation of liquid is effected in said membranes by said introduction step, said fresh liquid being of said initial composition.

11. The improvement of claim 10, wherein said fresh liquid is continually introduced into said first regions and said deactivated liquid is continually removed from said second regions.

12. The improvement of claim 10, wherein said regions are portions of the periphery of said membranes.

13. In a packaged membrane system having
(a) a plurality of at least partially spaced immobilized liquid membranes disposed in generally parallel surface-to-surface array to define both a first group of flow volumes and a second group of flow volumes alternating between said first flow volume group,
(b) means for spacing apart adjacent membranes disposed in each of the flow volumes of at least one of said first and second flow volume groups,
(c) means for defining the periphery of each of said flow volumes,
(d) means for providing separate access to and egress from the plurality of flow volumes in said first group and in said second group,
the improvement comprising, in combination with the above, (i) means for introducing fresh membrane liquid into first regions of said membranes and (ii) outlet means separate from said introduction means and in flow communication with second regions of said membranes for removing liquid from said second regions concurrently with the fresh liquid introduction such that substantially no accumulation of liquid is effected in said membrane by said fresh liquid introduction.

14. The improvement of claim 13, wherein said first regions of said membranes are disposed externally of the periphery of said flow volumes.

15. The improvement of claim 14, wherein said introduction means includes a chamber disposed exteriorly of said periphery-defining means, said first regions extending into said chamber.

16. The improvement of claim 15, wherein said removing means includes an additional chamber disposed exteriorly of said periphery-defining means, said second regions extending into said additional chamber.

17. The improvement of claim 13, wherein said first regions of said membranes are disposed internally of the periphery of said flow volumes.

18. The improvement of claim 17, further including:
(e) each membrane having first and second holes therethrough in the inner portion thereof, said first regions being disposed around said first holes,
(f) second regions of said membranes being disposed around said second holes,
(g) first and second groups of solid annular disks, each disk group containing a plurality of disks disposed coaxially in generally parallel surface-to-surface array, each disk having opposite first and second faces, each first group disk being in spaced generally coplanar arrangement with a second group disk to define pairs of generally coplanar disks, each coplanar pair of disks being disposed in one flow volume of said second group of flow volumes, each disk having a through-hole extending from its first face to its second face, said membranes being disposed in pairs, each pair being located between adjacent disks, each of said first holes being in alignment with the through-holes in the disk of said first group of disks to define in combination an access flow passage communicating with said first membrane regions, each of said second holes being in alignment with the through-holes in the disks of said second group of disks to define in combination an egress flow passage communicating with said second regions, and
(h) means for forcing together the disks and the membranes therebetween.

19. In a packaged membrane system, comprising
(a) a plurality of immobilized liquid membranes having spaced inner portions disposed in generally parallel surface-to-surface array to define both a first group of flow volumes and a second group of flow volumes alternating between said first flow volume group, each of said membranes having an outer portion surrounding its inner portion, the membranes constituting a first set of membranes and a second set of membranes alternating between said first membrane set, each membrane having an outer pair of spaced holes through its outer portion and an inner pair of spaced holes through its inner portion with each hole of said inner pair surrounded by a margin of the membrane,
(b) means for spacing apart adjacent membranes disposed in each of the flow volumes of at least one of said first and second flow volume groups,
(c) a plurality of gas-tight closed-loop frames disposed in generally parallel surface-to-surface array, each frame having opposite first and second loop faces, said frames being generally parallel to said membranes, each of said frames having a pair of spaced through-holes extending from its first loop face to its second loop face and frame channel means extending from each frame through-hole to an inner periphery of the frame,
first holes of the pairs of frame through-holes and first holes of the outer pairs of holes through the membrane outer portions being in alignment to define an access flow passage communicating with each first group flow volume through one of the frame channel means, second holes of the pairs of frame through-holes and second holes of the outer pairs of holes through the membrane outer portions being in alignment to define an egress flow passage communicating with each first group flow volume through the other frame channel means,
(d) first and second groups of disks, each disk group containing a plurality of disks disposed coaxially in generally parallel surface-to-surface array, the number of disks in each disk group being equal to one less than the number of said frames, each disk having opposite first and second faces, each first group disk being in spaced generally coplanar arrangement with a second group disk to define pairs of generally coplanar disks, each coplanar pair of disks being disposed in one flow volume of said second group of flow volumes, each disk having a through-hole extending from its first face to its second face and disk channel means extending from the disk through-hole to an outer periphery of the disk,
the through-holes of the disks in said first disk group and first holes of the inner pairs of holes through the membrane inner portions being in alignment to define in combination an access flow passage communicating with said second group of flow volumes through the disk channel means in the first group disks, the through-holes of the disks in said second disk group and second holes of the inner pairs of holes through the membrane inner portions being in alignment to define in combination an egress flow passage communicating with said second group of flow volumes through the disk channel means in the second group disks, each membrane of said first set being both in interfacial outer portion contact on one side thereof with a first adjacent membrane of said second set to define a pair of contacting outer portions and in interfacial margin contact on the other side thereof with a second adjacent membrane of said second set to define first and second generally coplanar pairs of contacting margins, said first and second adjacent membranes being disposed in opposite directions from said each membrane, each of the pairs of contacting outer portions being disposed between a pair of adjacent frames, each of said first pairs of contacting margins being disposed between a pair of adjacent first group disks and each of said second pairs of contacting margins being disposed between a pair of adjacent second group disks.

(e) means for compressing the frames to seal the membrane interface between each of the contacting outer portions and to place each pair of adjacent frames into sealing engagement with the outer membrane surfaces of the pair of contacting outer portions disposed therebetween, and (f) means for compressing the disks to seal the membrane interface between each of the contacting margins and to place each pair of adjacent disks into sealing engagement with the outer membrane surfaces of the pair of contacting margins disposed therebetween, the improvement comprising, in combination with the above, (i) means for introducing fresh membrane liquid into first regions of said membranes and (ii) outlet means separate from said introduction means and in flow communication with second regions of said membranes for removing liquid from said second regions concurrently with the fresh liquid introduction such that substantially no accumulation of liquid is effected in said membrane by said fresh liquid introduction.

20. The improvement of claim 19, wherein said first regions of said membranes extend beyond the external periphery of said frames.

21. The improvement of claim 20, wherein said introduction means includes a chamber disposed exteriorly of said periphery of said frames, said first regions extending into said chamber.

22. The improvement of claim 21, wherein said removing means includes an additional chamber disposed exteriorly of said periphery of said frames, said second regions extending into said additional chamber.

* * * * *